United States Patent [19]

Kobayashi et al.

[11] Patent Number: 4,801,416

[45] Date of Patent: Jan. 31, 1989

[54] TRANSPARENT AND LITTLE COLORED POLYARYLENETHIOETHER PRIMARY MELT MOLDING, PREPARATION AND UTILIZATION THEREOF

[75] Inventors: Akio Kobayashi; Toshitaka Kouyama; Yo Iizuka; Takayuki Katto; Zenya Shiiki, all of Iwaki, Japan

[73] Assignee: Kureha Kagaku Kogyo Kabushiki Kaisha, Tokyo, Japan

[21] Appl. No.: 924,346

[22] Filed: Oct. 24, 1986

[30] Foreign Application Priority Data

Oct. 25, 1985 [JP] Japan ................................ 60-238679

[51] Int. Cl.$^4$ ..................... B29C 55/12; B29C 47/00; C08G 75/14
[52] U.S. Cl. .................................. 264/177.1; 264/1.5; 264/1.6; 264/176.1; 264/177.17; 264/290.2; 264/331.11; 525/537; 526/62; 528/388
[58] Field of Search .................. 525/537; 526/62; 528/388; 264/331.11, 177.1, 176.1, 177.17, 290.2

[56] References Cited

U.S. PATENT DOCUMENTS

| | | | |
|---|---|---|---|
| 4,017,450 | 4/1977 | Bailey | 525/537 |
| 4,440,915 | 4/1984 | Asakura et al. | 525/537 |
| 4,605,713 | 8/1986 | Heitz et al. | 525/537 |
| 4,605,732 | 2/1986 | Heitz et al. | 525/537 |
| 4,645,826 | 2/1987 | Iizuka et al. | 525/537 |

FOREIGN PATENT DOCUMENTS 3529498  2/1987  Fed. Rep. of Germany ...... 528/388
143828  11/1984  Japan.

*Primary Examiner*—John C. Bleutge
*Assistant Examiner*—David W. Woodward
*Attorney, Agent, or Firm*—Wenderoth, Lind & Ponack

[57] ABSTRACT

A polyarylenethioether primary melt formed article having a Hunter whiteness higher than 30% and a parallel light transmittance Tp higher than 60%, as measured for a sheet with a thickness of 0.3 mm, at the process for obtaining the article which comprises producing a polyarylenethioether according to the polymerization reaction comprising a dehalogenation/sulfidization reaction between an alkali metal sulfide and a dihaloaromatic compound in a polar organic solvent by carrying out the reaction with the addition of an effective amount of a halo-substituted organic compound to obtain a stabilized polyarylenethioether, and then subjecting the polyarylenethioether to melt extrusion. The melt formed article thus produced can be subjected to further melt processing to produce a secondary melt formed article or structure of polyarylenethioether.

10 Claims, No Drawings

TRANSPARENT AND LITTLE COLORED POLYARYLENETHIOETHER PRIMARY MELT MOLDING, PREPARATION AND UTILIZATION THEREOF

BACKGROUND OF THE INVENTION

1. Field of Utilization in Industry

This invention relates to polyarylenethioether primary melt formed articles or structures obtained by melt extrusion and having transparency and little coloration, which means in this specification self-coloration or discoloration and does not mean coloration by adding some colorants, to processes for producing the same, and to secondary melt formed articles such as films, sheets, and fibers obtained by melt processing of the primary articles in the form of pellets.

2. Prior Art

Polyarylenethioethers are thermoplastic resins having high crystallinity, which can be formed into products by injection molding, for example, as a matter of course, but also can be processed into other formed products such as films, sheets, plates, and fibers by extrusion, compression molding, inflation, melt spinning, and stretching, and they have been expected to provide melt processed articles having excellent properties.

However, most of the commercially available polyarylenethioethers in the prior art have been resins with apparent melt viscosities enhanced by "curing" of a relatively low melt viscosity polymer (namely, a low molecular weight polymer), that is, causing crosslinking, branching reactions, etc., to occur by a high temperature treatment of the polymer in the presence of oxygen, for example. The resins of melt viscosities increased by such "curing" have been accompanied by a number of problems such as excessive coloration, and insufficient mechanical strength due to many crosslinked branched structures.

CONCEIVABLE MEASURES FOR SOLUTION

We have found a process for economically producing a high molecular weight linear polyarylenethioether according to a polymerization method, in which a large amount of water is added, and the polymerization temperature is elevated at the same time in the course of the polymerization reaction (two-step polymerization with water supplementation) (Japanese Patent Application No. 126725/1984).

The polyarylenethioether obtained by this method has generally a sufficiently high melt viscosity and therefore is applicable as it is without "curing" for melt processing such as extrusion, compression molding, stretching, and thermal fixing. Furthermore, since it has a linear structure without undergoing "curing" and has the characteristic of excellent mechanical strength, it has been expected to produce a formed article which is substantially transparent and has little coloration because no "curing" is required.

However, even when the high molecular weight polyarylenethioether developed by the present inventors is used, although melt formed articles with little coloration can be easily obtained when the polymer is formed by a method in which the polymer is melted under pressurization by means of a hot press, for example, coloration is liable to occur according to the melt forming method usually practiced in industry, that is, according to the method in which the polymer is extruded by heating and melting within a cylinder by means of an extruder, whereby it has been difficult to obtain a transparent formed article with little coloration.

Generally speaking, in producing formed articles of polyarylenethioethers by melt extrusion, except in special cases, the polymer is ordinarily first formed into pellets by a melt extruder, and then the pellets are melt processed into formed articles as is generally practiced in the art. However, the pellets thus formed in the prior art are liable to exhibit marked coloration during melt extrusion as described above, and the films, fibers, etc., obtained by subjecting the colored pellets again to melt processing will become further excessively colored and thus give rise to a problem in practical application. Such coloration also has a serious effect on transparency or aesthetic appearance not only of films, sheets, fibers, but also in other formed products, which is a problem influencing greatly their commercial values. Thus, it has been strongly desired to produce polyarylenethioether pellets which are transparent with little coloration.

SUMMARY OF THE INVENTION

We have studied intensively the causes of coloration which occurs when pellet-shaped articles are obtained by melt processing of a substantially linear high molecular weight polyarylenethioether requiring no curing by means of an extruder, and consequently found that coloration of pellet-shaped articles obtained by the melt extrusion method can be greatly reduced by employing means (i) to stabilize the terminal ends of the polyarylenethioether main chain in polymerization, (ii) to make contact between the polyarylenethioether and heavy metals (particularly iron) as small as possible, etc.

The present invention has been accomplished on the basis of this finding.

More specifically, the polyarylenethioether primary melt formed article according to the present invention is obtained by melt extrusion of a polyarylenethioether and has the following properties:
(a) Hunter whiteness > 30%
(b) parallel light transmittance $T_p > 60\%$ (each being measured for a sheet with a thickness of 0.3 mm).

The present invention also concerns utilizing exclusively the properties of the above polyarylenethioether primary melt formed article.

More specifically, the polyarylenethioether secondary melt formed article according to the present invention is obtained by subjecting the polyarylenethioether primary melt formed article having the above properties obtained by melt extrusion of a polyarylenethioether to a further melt processing.

Further, the present invention also concerns a process for producing the polyarylenethioether primary melt formed article as specified above. More specifically, the processs for producing the polyarylenethioether primary melt formed article having the above properties according to the present invention comprises preparing a polyarylenethioether according to the polymerization reaction comprising a dehalogenation/sulfidization reaction between an alkali metal sulfide and a dihaloaromatic compound in a polar organic solvent by carrying out the reaction with addition of an effective amount of a halo-substituted organic compound to obtain a stabilized polyarylenethioether and then subjecting the polyarylenethioether to melt extrusion.

Another process for producing the polyarylenethioether primary melt formed article having the above properties comprises producing a polyarylenethioether according to the polymerization reaction comprising a dehalogenation/sulfidization reaction between an alkali metal sulfide and a dihaloaromatic compound in a polar organic solvent by carrying out the reaction by means of a reactor which is made of titanium at least at the portion thereof contacting the reaction mixture to obtain a polyarylenethioether and then melt extruding the polyarylenethioether through a melt extruder which is made of a non-ferrous alloy at its face contacting the molten polymer.

The polyarylenethioether primary melt formed article according to the present invention, particularly a pellet, is by far superior to the pellets of the prior art in Hunter whiteness and parallel light transmittance Tp.

As described above, the polyarylenethioether formed by a hot press is different in coloration characteristic from that melt extruded by an extruder, and therefore it does not necessarily follow that formed articles with little coloration obtained by a hot press as described in the examples of patent literatures of the prior art can afford products with little coloration when formed articles such as films, fibers, or others are industrially manufactured by melt extrusion.

The pellet of the present invention is obtained by the melt extrusion method and exhibits excellent Hunter whiteness and parallel light transmittance. Accordingly, when this pellet is used, formed articles such as films, fibers or others obtained therefrom are also transparent and have very little coloration.

Such a pellet can be produced commercially with ease according to the production process of the present invention.

The term "primary melt formed article" as mentioned in the present invention is meant to represent the melt formed article obtained for the first time by melt processing of a polymer base material. This is generally a pellet-shaped formed material, for example, in most cases and is subjected further to melt processing for formation of a final formed article in many cases. However, the primary melt formed article may sometimes be provided directly as the final formed product.

DETAILED DESCRIPTION OF THE INVENTION

Primary Melt Formed Article

Polyarylenethioether

The polyarylenethioether of the present invention has a (—Ar—S—)$_n$ structure (Ar: arylene group). As the polyarylenethioether polymer, those having arylene groups comprising a p-phenylene group as the main component are preferred for their heat resistance and moldability. Examples of arylene groups other than a p-phenylene group are an m-phenylene group

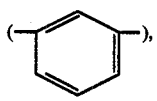

an o-phenylene group

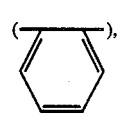

an alkyl-substituted phenylene group

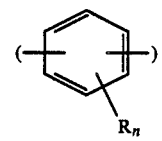

[R: alkyl group (preferably lower alkyl group), n is an integer of 1 to 4], a p,p'-diphenylenesulfone group

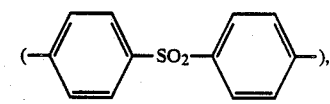

a p,p'-diphenylene group

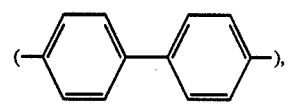

a p,p'-diphenyleneether group

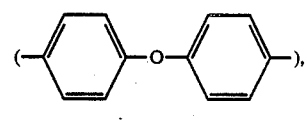

a naphthalene group

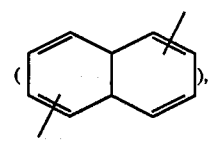

1,2,4-triphenylene group

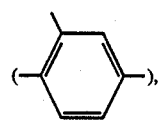

and a 1,3,5-triphenylene group

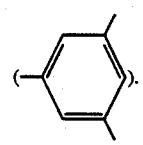

With respect to the heat resistance of formed articles, polyphenylenethioethers comprising substantially only

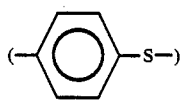

recurring units are preferred. On the other hand, with respect to ease in melt processing, which will result in lowering of the processing temperature to easily obtain pellets with little coloration, copolymers of polyphenylenethioether are preferred. As the copolymer, those containing 5 to 40 mol%, particularly 10 to 25 mol% of the

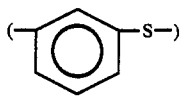

units or the units

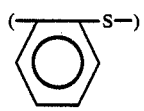

are preferred. If these m- or o-phenylenethioether units are contained in an amount of 5 mol% or more, the improved effect of melt processing can be exhibited, while heat resistance and mechanical properties will not be remarkably lowered unless their contents exceed 40 mol%. Further, among the copolymers containing 60 to 95 mol% of the same

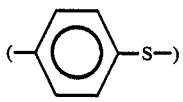

units, rather than random copolymers, block copolymers containing the recurring units of

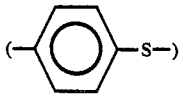

and the recurring units of

in continuous block bondings are preferred. This is because block copolymers can produce final formed articles having the same processability and superior heat resistance and mechanical characteristics than random copolymers. Such block copolymers and their preparation methods are described in Japanese Patent Application No. 134633/1984.

The polyarylenethioether should desirably have an appropriate molecular weight or melt viscosity in physical properties and processability. That is, those having a melt viscosity ($\eta^*$) within the range of from 1,000 to 30,000 poise determined at a temperature of 310° C. and a shearing rate of 200 sec$^{-1}$, particularly preferably from 1,500 to 20,000 poise, are preferred. With a polymer having a melt viscosity less than 1,000 poise, the formed article obtained from the pellet is inferior in mechanical properties. On the other hand, with a polymer having a melt viscosity in excess of 30,000 poise, it becomes difficult to prepare formed articles in the form of pellets by melt extrusion, and also the processing temperature becomes higher, whereby coloration will more readily occur.

The polyarylenethioether to be used for the polyarylenethioether primary melt formed article which is transparent and has little coloration of the present invention should be a high molecular weight polymer which requires no increase in molecular weight by the so-called "curing" and should also be a substantially linear polymer in order to be easily processed into films, sheets, fibers, etc. Such a substantially linear, high molecular weight polyarylenethioether can be produced particularly economically according to "the two-step polymerization with water supplementation" which is a new polymerization method we have developed (Japanese Patent Application No. 126725/1984). This is a process for producing a polyarylenesulfide having a melt viscosity of 1,000 poise or higher (melt viscosity is measured at 310° C. and at a shearing rate of 200 sec$^{-1}$), which comprises carrying out the reaction between an alkali metal sulfide and a dihaloaromatic compound in a polar organic solvent to obtain a polyarylenesulfide, wherein the reaction is carried out in at least the two steps as described below.

(1) The step of carrying out the reaction at a temperature of 180° C. to 235° C. under a state in which 0.5 to 2.4 mols of water is present per one mol of the alkali metal sulfide charged to form a polyarylenesulfide having a melt viscosity of 5 to 300 poise at a conversion of the dihaloaromatic compound of 50 to 98 mol%.

(2) The step of continuing the above reaction by adding water so that 2.5 to 7.0 mols of water will be present per 1 mol of the alkali metal sulfide charged and also elevating the temperature to 245°–290° C.

Transparency and coloration degree

The polyarylenethioether according to the present invention is in the form of a primary melt formed article thereof, typically pellets, and the pellets are excellent with respect to transparency and coloration characteristic.

In the present invention, as evaluation indices of transparency and coloration characteristic, Hunter whiteness and parallel light transmittance are used. Although it may be possible to distinguish, according to Hunter whiteness, a colorless sample from a colored sample provided that the both are almost the same in transparency, it is impossible to distinguish a sample which is transparent and colorless from a sample which is not transparent but white. For this reason, other than Hunter whiteness, which represents coloration degree, parallel light transmittance Tp is used as the index for evaluation of transparency.

For evaluation of both characteristics, if the samples are in the form of pellets of melt extruded articles, measurements are difficult, and therefore the pellets of the present invention are formed into a sheet by melting under pressurization in a non-oxidative atmosphere so as to avoid oxidation of the polymer before being provided for measurement of coloration characteristic and transparency. Also, since the parallel light transmittance Tp will vary depending particularly on the thickness, a sheet with a thickness of 0.3 mm was used as the sample. That is, the sample for evaluation of both characteristics is an amorphous sheet with a thickness of 0.3 mm which is obtained by preheating the pellets in a nitrogen gas stream at 320° C. by means of a hot press for 2 minutes, then forming the pellets into a sheet by heating at 320° C. for 1 minute and quenching the sheet.

Hunter whiteness was measured by means of a color differential meter (Color Ace, produced by Tokyo Denshoku K.K.), and parallel light transmittance Tp by means of a haze meter (TC-H3, produced by Tokyo Denshoku K.K.), based on Japanese Industrial Standards (JIS) K 6714.

The pellet of the present invention has a Hunter whiteness higher than 30%, preferably 35% or higher and also a parallel light transmittance Tp higher than 60%, preferably 65% or higher and has higher transparency and less self coloration as compared with the pellets of the prior art, as can be clearly seen from the Comparative Examples set forth hereinafter.

The pellet of the present invention has undergone a heating melting step in the cylinder of an extruder and the mixing step with a screw, and therefore evaluation of the pellet as described above can reflect much better the real situation as a practical evaluation method for coloration characteristics and transparency of formed articles such as films and fiber comparing with coloration characteristic and transparency of the formed articles prepared by melting under pressurization directly from the polymer base material by means of a hot press, for example, as conventionally practiced on a laboratory scale.

PREPARATION OF PRIMARY MELT FORMED ARTICLE

For the present invention, any preparation method of pellets can be adopted provided that the pellet obtained thereby is higher than 30% in Hunter whiteness and higher than 60% in $T_p$.

However, according to the conventional preparation methods it turned out to be difficult to obtain a pellet having such properties. So, more specifically, we investigated the causes for coloration which occurs during melt extrusion of a polyarylenethioether, and consequently estimated the process in which coloration occurs as follows.

(i) By heating in the extruder, decomposition occurs at the chemically active portion of the polymer (particularly terminal ends of the polymer) to cause coloration.

(ii) The decomposed product formed by the decomposition reaction reacts with heavy metal components on the metal surface (particularly the metal surface containing much iron) or the polymer in the extruder forms oxides of heavy metal or heavy metal compounds such as sulfate, etc., which further react with or are mixed with the polymer under molten state to cause coloration.

The process for preparation of the pellet of the present invention has been developed as a result of investigation of a method for preventing such colorations based on the above presumptions. The pellet according to the present invention, therefore, can be prepared according to the two methods broadly classified as follows.

(1) Preparation of pellet from stabilized polyarylenethioether

Terminal ends of ordinary polyarylenethioethers are thermally or chemically unstable as described above and susceptible to decomposition during melt extrusion process.

Stable polyarylenethioethers can be produced by stabilizing the terminal ends of the main chain by capping of a halo-substituted organic compound during polymerization.

More specifically, the process comprises producing a polyarylenethioether according to the polymerization reaction comprising dehalogenation/sulfidization of an alkali metal sulfide and a dihaloaromatic compound in a polar organic solvent by carrying out the reaction with post-addition of an effective amount, preferably 0.1 to 20 mols per 100 mols of the dihaloaromatic compound, of a halo-substituted organic compound (preferably when $\eta^*$ has reached at least 500 poise (measured at a temperature of 310° C. and a shear rate of 200 sec$^{-1}$)), preferably under the conditions of a temperature of 100° C. or higher, more preferably 150° C. or higher for 0.5 hours or longer.

In this case, the halo-substituted organic compound may include halo-substituted alkanes such as chlorobutane, chloroethane; mono-halo-substituted aliphatic hydrocarbons such as (chloromethyl)benzene; mono-halo-substituted alicyclic hydrocarbons such as chlorocyclohexane and bromocyclohexane; ether compounds such as chloromethylether; thioether compounds such as chlorodiphenylthioether; halo-substituted alkylbenzenes such as m-chloroethylbenzene; halo-substituted aromatic ethers such as m-chloroanisol and p-chloroanisol; or otherwise halo-substituted aromatic hydrocarbons such as bromobenzene and bromonaphthalene. These have typically C—X (X: halogen) bonds. Among them, preferable are mono-halo-substituted organic compounds, particularly mono-halo-substituted aromatic compounds. Specific examples of mono-halo-substituted aromatic compounds correspond to the mono-halo-derivatives of the di-halo-substituted aromatic compounds as the starting material for polyarylenethioethers.

By the reaction with these halo-substituted organic compounds of Ar—SM and ArX (M: alkali metal, X: halogen) which are considered to exist at the terminal ends of the main chain, particularly unstable ⌁Ar—SM is considered to be changed to the stable structure ⌁Ar—S—R (R: is an organic residue of a halo-organic compound), whereby decomposition or liberation of harmful decomposed products at high temperature can be prevented.

Such a stabilized polyarylenethioether can provide pellets with little coloration even by the use of a conventional melt extruder, namely, an extruder constructed of parts of iron or an alloy composed mainly of iron such as carbon steel, nitrided steel, and stainless steel at the metal surfaces which contact the molten polymer such as those of the cylinder or screw. Further, in the preparation of a stabilized polyarylenethioether, a polymerization reactor made of stainless steel in general may be used, but it is preferable to use a polymerization reactor constructed of titanium at the portion which contacts the reaction mixture described below in (2). Still better results can be obtained, as a matter of course, if the pellet is prepared by practicing melt extrusion by the use of a part or all of the melt extrusion method as described in (2).

Generally speaking, melt extrusion is preferably performed at a temperature within the range from the melting point to 390° C. At a temperature over 390° C., coloration may occur.

(2) Preparation of pellet from polyarylenethioether with little heavy metal content As speculated above, polyarylenethioethers containing heavy metal components (particularly iron) are susceptible to decomposition and coloration. We were able to successfully obtain a pellet having the properties of the present invention by carrying out preparation and melt extrusion of a polyarylenethioether while avoiding contact with iron components as much as possible.

More specifically, in preparation of a polyarylenethioether according to the polymerization reaction comprising a dehalogenation/sulfidization reaction of an alkali metal sulfide and a dihalogen aromatic compound in a polar organic solvent, when using a conventional corrosive reactor comprising iron as the main component at the portion which contacts the reaction mixture, iron compounds, etc., may be formed by chemical corrosion and physical corrosion until such compounds are contained up to about 30 to 100 ppm in the polymer. Accordingly, in the present invention, by the use of a reactor with the use of particularly titanium as the constructional material at least at the portion of contact with the reaction mixture (Japanese Patent Application No. 143828/1984), a polyarylenethioether reduced in iron component to about several ppm or less can be obtained. Further, the polyarylenethioether is melt extruded through an extruder constructed of an anti-corrosive alloy of a non-iron metal or an anti-corrosive alloy with very little iron content at the surface contacted by the molten polymer (i.e., cylinder screw, die, etc.). As the non-ferrous alloy, metals or alloys of tungsten, cobalt, chromium, or nickel are particularly preferred. Of course, the surface may be coated with these metals or alloys. By combination of these methods, transparent and little colored pellets can be obtained.

Utilization of primary melt formed aritcle/preparation of secondary melt formed article The pellet-shaped melt formed article with a Hunter whiteness > 30% and parallel light transmittance Tp > 60% obtained as described above can be melt processed into transparent and little colored films, sheets, fibers, etc., according to conventional melt processing methods, namely, injection molding, extrusion, melt spinning, compression molding, inflation molding, blow molding, etc. However, when using pellets obtained from polyarylenethioethers other than stabilized polyarylenethioethers, it is desirable to use a melt processing machine in which the portion contacting the molten polymer is constructed of a non-iron type alloy. This is because decomposition of terminal ends, etc., may occur again, and the decomposed products may react with the metal surface to bring about coloration.

Typical examples of the secondary melt formed structures are as described below.

(1) Biaxially stretched oriented film

The pellet of the present invention can be first melt extruded into a sheet, which is subsequently biaxially stretched to form a transparent and substantially colorless biaxially stretched film.

More specifically, the pellet of the present invention is fed into a melt extruder provided with a T-die to be extruded into a sheet with a thickness of 10 to 1,000 $\mu$m, then immediately, or after being once wound into a roll, fed to a biaxially stretching device, where it is stretched successively or at one time within the range of 2 to 8-fold in the longitudinal direction and 1.5 to 7-fold in the lateral direction at a temperature range from 80° to 150° C., subsequently optionally heated within a temperature range from 200° to 290° C. under a tension not less than null for 0.5 to 1,000 seconds to enhance crystallinity. Then, if necessary, thermal relaxation is carried out under practical free tension with a temperature in the range of from 200° to 290° C., whereby beautiful biaxially stretched oriented film having high colorless transparency is obtained.

The biaxially stretched film thus obtained, which employs the pellet of the present invention, is substantially colorless and transparent. To the best of our knowledge, no such substantially colorless and transparent biaxially stretched film has been obtained in the prior art. However, in carrying out comparison with the prior art product, since the film is thin, and also it is difficult to compare samples with the same thickness, such a thin film is usually unsuitable to evaluate its colorlessness and transparency in terms of Hunter whiteness and Tp. Accordingly, as an evaluation index for colorless transparency which is suitable for measurement of a thin sample with a thickness of 1 to 100 $\mu$m and is not influenced by the thickness within that range, the value of $\epsilon c$ derived from the law of Lambert-Beer was used. Besides, the value of $\epsilon c$ was determined from the absorbance of light with a wavelength of 450 nm which can detect sharply coloration characteristic or opaqueness of a thin film. Absorbance was measued by means of a spectrophotometer (Two Wavelength Spectrophotometer Model 557, produced by Hitachi Seisakusho K.K.).

The law of Lambert-Beer is represented by the following formula.

$$\log_{10}(I/I_o) = -\epsilon c d$$

$I/I_o$: absorbance of light with wave length of 450 nm
$\epsilon$: inherent constant of completely non-colored transparent film
$c$: coloration density
$d$: thickness of measured material (mm)
$\epsilon c$: absorption index (mm)$^{-1}$.

Most of the biaxially stretched films of the present invention were found to be substantially colorless and transparent films with $\epsilon c$ values of 10 or less. Since the appearance of a biaxially stretched oriented film is a very important property in its uses, it should have a $\epsilon c$ value of 15 or less, particularly preferably 10 or less.

Other applications of the pellet of the invention

The pellet-shaped melt formed article of polyarylenethioether which is transparent and has little coloration of the present invention can be produced in a large amount industrially and economically and therefore can be utilized for various kinds of application fields. When the pellet is melt processed directly as it is into a desired formed article without addition of a colorant or a filler, transparent and little colored films, sheets, fibers, bottles, etc., can be obtained. These can be utilized in various fields such as those of magnetic recording materials, optical magnetic recording materials, optical materials, and food packaging materials.

Into the pellet of the present invention can be blended colorants, fibrous fillers (glass fibers, etc.) and inorganic fillers ($SiO_2$ powder, $TiO_2$ powder, $Al_2O_3$ powder, $CaCO_3$ powder, kaolin, mica, etc.) before it is melt processed into a formed article. In such a case, the transparency may be reduced due to the presence of fillers, but formed articles with excellent color tone and luster can be obtained. From the pellet-shaped article of the present invention, a thick formed article can also be obtained by injection molding, extrusion, compression molding, etc. In the case of a thick formed article, the product becomes generally devitrified due to formation of coarse spherulites. However, even so, products with excellent tone and luster can be obtained.

These polyarylenethioether melt formed articles having beautiful appearance can be utilized in the fields of electronic parts, domestic electrical parts, precision mechanical parts (cameras, watches, etc.).

EXPERIMENTAL EXAMPLES

Comparative Example P01

Into a polymerization vessel with a titanium-lined inside were charged 3.75 kg of hydrous sodium sulfide (solid content: 46.0%) and 7 kg of N-methylpyrrolidone, and water was distilled out by elevating the temperature to about 200° C. Then, a mixture of 3.25 kg of p-dichlorobenzene and 3 kg of N-methylpyrrolidone was added, and polymerization was carried out at 220° C. for 5.5 hours. Then, 1.1 kg of water was added, and polymerization was carried out at a reactor temperature of 265° C. for 5 hours. The polymer was separated by filtration from the reaction mixture, washed with acetone and with water, and then dried overnight in a vacuum dryer at 80° C. to obtain a polymer P01.

Example P1

In the polymerization of Comparative Example P01, after elapse of 3.5 hours in the later stage polymerization at 260° C. (polymer $\eta^* = 4400$ poise (measured at a temperature of 310° C. and a shear rate of $200^{-1}$)), 0.5 mol of 1-chloro-n-butane was added per 100 mols of p-dichlorobenzene charged, and the reaction was further continued at 140° C. for 1 hour. After completion of the reaction, the same operations as in Comparative Example P01 were conducted to obtain a polymer P1.

Example P2

Into a Ti-lined autoclave were charged 560 g of $Na_2S.xH_2O$ (solid content: 46.0%) and 1.1 kg of N-methylpyrrolidone, and water was distilled out by heating to about 200° C. Then 460 g of m-dichlorobenzene dissolved in 450 g of N-methylpyrrolidone was added, and polymerization was carried out at 220° C. for 8 hours to prepare a reaction mixture M1 containing (m-phenylenethioether) prepolymer.

Separately, 3.15 kg of $Na_2S.xH_2O$ (solid content: 46.0%) and 6 kg of N-methylpyrrolidone were charged into a Ti-lined autoclave, and water was distilled out by heating to about 200° C. Then, the reaction mixture M1 and 2.53 kg of p-dichlorobenzene dissolved in 2.72 kg of N-methylpyrrolidone were added to carry out polymerization at 215° C. for 10 hours, and further polymerization was carried out with addition of 1.1 kg of water at 260° C. for 5 hours. The melt viscosity $\eta^*$ became 3200 poise. As the next step, bromobenzene was added in an amount of 4.0 mols per 100 mols of the p-dichlorobenzene charged, and polymerization was further conducted at 260° C. for 3 hours. The same post-treatment as in Comparative Example P01 was conducted to obtain a (p-phenylenethioether/m-phenylenethioether) block copolymer P2.

Examples P3 and P4

Example P2 was repeated except that 4 mols of m-chloroanisol and m-chloroethylbenzene were respectively added per 100 mols of p-dichlorobenzene charged in place of bromobenzene to obtain block copolymers P3 and P4, respectively.

Examples P5 and P6

Example P1 was repeated except that 6.0 mols each of m,m'-dichlorodiphenylthioether and p,p'-dichlorophenylthioether were added respectively per 100 mols of p-dichlorobenzene charged in place of chloro-n-butane, and the reaction was continued at 265° C. for 5 hours to obtain polymers P5 and P6, respectively.

Comparative Example P02

Into a titanium-lined autoclave were charged 25 mols of sodium sulfide (solid content: 59.7%), 10 g of sodium hydroxide, 25 mols of lithium acetate (dihydrate) and 7.92 g of N-methyl-pyrrolidone, and water was distilled out by elevating the temperature to 202° C. Then, a mixture of 25.5 mols of p-dichlorobenzene and 2 kg of N-methylpyrrolidone was added, and polymerization was carried out at 245° C. for 3 hours. After post-treatment conducted similarly as in Comparative Example P01, a polymer P02 was obtained.

Comparative Example P03

Into a titanium-interlined autoclave were charged 25 mols of sodium sulfide (solid content: 59.7%), 10 g of sodium hydroxide, 25 mols of sodium benzoate and 7.92 g of N-methylpyrrolidone, and water was distilled out by elevating the temperature to 202° C. Then, a mixture of 25.5 mols of p-dichlorobenzene and 2 kg of N-methylpyrrolidone was added, and polymerization was carried out at 250° C. for 5 hours. After a post-treatment conducted similarly as in Comparative Example P01, a polymer P03 was obtained.

Comparative Examples P04, P05 and P06

Polymerization was carried out similarly as in Comparative Example P01, P02 and P03 except for using an autoclave made of stainless steel to obtain polymers P04, P05 and P06, respectively. Each of these polymer powders was found to be slightly colored.

Processing Examples PP1 through PP4, PP01, PP02 and PP03

For the polymers P1 through P4 and P01, P02, and P03, each polymer was melted by heating to 350° C. by means of a single-screw kneading extruder (cylinder: nitrided steel, screw barrel: nitrided steel) and extruded through a die into a cord-like shape, which was immediately cooled with water and cut to prepare respective pellets PP1 through PP4 and PP01, PP02, PP03.

Processing Examples PP5, PP6, PP04, PP05, and PP06

For the polymers P5, P6, P04, P05, and P06, each polymer was melted by heating to 350° C. by means of a single-screw extruder (cylinder: nitrided steel, screw barrel: stainless steel), immediately cooled with water and cut to prepare respective pellets PP5, PP6 and PP04, PP05, and PP06.

Processing Examples PP7, PP07, PP08

For the polymers P01, P04 and P05, each polymer was melted by heating to 350° C. by means of a codirection rotating twin-screw extruder (cylinder: tungsten alloy, screw barrel: hard chromium plated), extruded through a die into a cord-like shape, which was immediately cooled with water, and cut to prepare respective pellets PP7, PP07, and PP08.

Processing Examples PP8, PP09

For the polymers P02 and P06, each polymer was melted by heating to 350° C. by means of a single-screw extruder (cylinder: cobalt alloy, screw barrel: hard chromimum plated), extruded through a die into a cord-like shape, which was immediately cooled with water and cut to prepare respective pellets PP8 and PP09.

Evaluation

The respective pellets of PP1 through PP8, PP01 through PP09 were molded into a sheet with a thickness of 0.3 mm by means of a hot press and Hunter whiteness and parallel light transmittance Tp of each sheet were measured. The results are summarized in Table 1.

Also, by using directly several kinds of base polymer materials, sheets with a thickness of 0.3 mm were formed according to the same method as in case of pellets, and values of Hunter whiteness and parallel light transmittance were determined. The results are summarized in Table 1.

characteristic as compared with the melt formed pellets melt extruded through an extruder. Thus, it has been found that this evaluation method is not appropriate for evaluation of coloration characteristic of film or sheet in practical application.

Processing Examples BF-1 through BF-5 and BF01 through BF06

For the pellets PP1, PP2, PP3, PP6, PP8, PP01, PP02, PP03, PP04, PP06 and PP08, each pellet was melt extruded into a sheet through the extruder employed in the Processing Example PP7 provided with a T-die, which sheet was quenched by a cooling drum to prepare a T-die sheet with an average thickness of 0.2 mm. By means of a small-scale film stretcher (produced by T. M. Long Co.), the sheet was stretched 3.0–3.5-fold at a temperature of 80°–90° C. each in longitudinal direction and lateral direction to prepare a biaxially stretched oriented film, which was further fixed on a metal frame for heat treatment at 250° C. for 15 minutes. Subsequently, the film was taken off from the metal frame and subjected to heat treatment under free tension at 240° C. for 5 minutes to prepare biaxially stretched oriented films BF1 through BF5 and BF01 through BF06 having thicknesses of 20 to 30 μm, respectively.

TABLE 1

| | Polymer material | | | Melt extruder material | | Properties of extruded pellet | |
| | Code | Type | Reactor material | Cylinder | Screw | Hunter whiteness (%) | Parallel light transmittance (%) |
|---|---|---|---|---|---|---|---|
| PP1 | P1 | Stabilized | Titanium | Nitrided steel | Nitrided steel | 42 (43) | 72 (75) |
| PP2 | P2 | " | " | " | " | 45 (48) | 77 (78) |
| PP3 | P3 | " | " | " | " | 46 | 78 |
| PP4 | P4 | " | " | " | " | 45 | 77 |
| PP5 | P5 | " | " | " | Stainless steel | 43 | 72 |
| PP6 | P6 | " | " | " | Stainless steel | 42 (45) | 72 |
| PP7 | P01 | Non-stabilized | Titanium | Tungsten alloy(*2) | Hard chromium plated | 34 | 68 |
| PP8 | P02 | " | " | Cobalt alloy(*3) | Hard chromium plated | 33 | 66 |
| Comp. Exam. | | | | | | | |
| PP01 | P01 | Non-stabilized | Titanium | Nitrided steel | Nitrided steel | 5 (28) | 25 (59) |
| PP02 | P02 | " | " | " | " | 7 (40) | 32 (72) |
| PP03 | P03 | " | " | " | " | 8 (42) | 35 (74) |
| PP04 | P04 | " | JIS SUS | " | Stainless steel | 1 (20) | 20 (51) |
| PP05 | P05 | " | JIS SUS | " | " | 4 | 25 |
| PP06 | P06 | " | JIS SUS | " | " | 2 (21) | 23 (52) |
| PP07 | P04 | " | JIS SUS | Tungsten alloy | Hard chromium plated | 4 | 22 |
| PP08 | P05 | " | JIS SUS | " | " | 6 (42) | 28 (64) |
| PP09 | P06 | " | JIS SUS | Cobalt | " | 6 | 26 |

(*1)values in parentheses: values measured for sheets directly formed into sheet from base material
(*2) ® XALOY (produced by XALLOY CO.)
(*3) ® H-ALOY (produced by Hitachi Kinzoku K.K.)

As can be seen from the results in Table 1, the polyarylenethioethers of the prior art, namely, the polymers polymerized without stabilization of the terminal ends produced the result that the pellets obtained by means of a melt extruder made of an iron rich alloy are of low values in both Hunter whiteness and Tp are excessively colored and inferior in transparency even when an autoclave made of titanium is used, to say nothing of the case where an autoclave made of stainless steel is used. Also, when an autoclave made of stainless steel was employed, the pellets obtained had low values in both Hunter whiteness and Tp even when obtained by means of an extruder made of a non-iron allow.

Also, the sheets melt formed directly from base materials which have been used in the prior art for evaluation of physical properties were found to produce data which are by far different with respect to coloration For these films, absorbance at 450 nm was measured by a spectrophotometer to obtain the value of εc (mm$^{-1}$) from the Lambert-Beer formula. The results are summarized in Table 2.

TABLE 2

| Biaxially stretched oriented film code | Pellet code | Absorption index εc (mm$^{-1}$) of biaxially stretched film(*1) |
|---|---|---|
| (Examples) | | |
| BF1 | PP1 | 7 |
| BF2 | PP2 | 6 |
| BF3 | PP3 | 5 |
| BF4 | PP6 | 7 |
| BF5 | PP8 | 7 |
| (Comp. Exam.) | | |
| BF01 | PP01 | 22 |
| BF02 | PP02 | 20 |

TABLE 2-continued

| Biaxially stretched oriented film code | Pellet code | Absorption index εc $(mm^{-1})$ of biaxially stretched film(*1) |
|---|---|---|
| BF03 | PP03 | 19 |
| BF04 | PP04 | >30 |
| BF05 | PP06 | >30 |
| BF06 | PP08 | 26 |

(*1) absorption index at 450 nm

As can be seen from the results in Table 2, from the pellets of the present invention having values of Hunter whiteness higher than 30% and Tp higher than 60%, highly colorless transparent biaxially stretched films can be obtained, showing also low values of εc of 7 or less.

On the other hand, the biaxially stretched films (BF01 through BF04) prepared from the pellets outside the scope of the present invention as reported in the literatures of the prior art are considerably colored, showing εc values of 20 or higher, to be clearly distinguishable from the pellet of the present invention.

Spinning Example

When spinning was performed under the conditions shown below for the pellet PP3 by means of a melt spinning tester (produced by Fuji Filter K.K.), beautiful multi-filaments (monofilament diameter about 50 μm) which were approximately colorless and transparent were obtained.

Nozzle: 0.5 mmφ×18 holes
Nozzle temperature: 315° C.
Extruded amount: 5.3 g
Taking-up speed: 100 m/min.
Cooling method: air cooling

What is claimed is:

1. A process for producing a polyarylenethioether primary melt formed article having the following properties:
   (a) Hunter whiteness>30%
   (b) parallel light transmittance Tp>60%, as measured for a sheet with a thickness of 0.3 mm, which comprises producing a polyarylenethioether according to the polymerization reaction comprising dehalogenation/sulfidization reaction between an alkali metal sulfide and a dihaloaromatic compound in a polar organic solvent, and then subjecting the polyarylenethioether to melt extrusion, said reaction being carried out by means of a reactor which is constructed of titanium at least at the portion contacting the reaction mixture and said melt extrusion being carried out through the melt extruder which is constructed of a nonferrous alloy at the surface contacting the molten polymer.

2. A process according to claim 1, wherein the primary melt formed article produced is further processed into a secondary melt formed article by subjecting the primary melt formed article to melt processing.

3. A process according to claim 1, wherein the Hunter whiteness is 35% or higher.

4. A process according to claim 1, wherein the parallel light transmittance is 65% or higher.

5. A process according to claim 2, wherein the secondary melt formed article is a film, sheet or fiber.

6. A process according to claim 5, wherein the film or sheet is a biaxially stretched oriented film or sheet having an absorption index of εc in the Lambert-Beer formula of not more than 15:

Lambert-Beer Formula:

$$\log_{10}(I/I_o) = -\epsilon cd$$

I/Io: absorbance of light with wave length of 450 nm
ε: Inherent constant of completely noncolored film
c: coloration density
d: thickness of film or sheet (mm)
εc: absorption index $(mm)^{-1}$.

7. A process according to claim 6, wherein the absorption index in the Lambert-Beer formula is not more than 10.

8. A process according to claim 1, wherein the polymerization reaction is carried out with addition of 0.1 to 20 mols per 100 mols of the dihalo-aromatic compound of a mono halo-substituted organic compound.

9. A process according to claim 8, wherein the mono halo-substituted organic compound is a mono halo-substituted aromatic compound.

10. A process according to claim 8, wherein the mono halo-substituted organic compound is added when the melt viscosity determined at a temperature of 310° C. at a shearing rate of 200 $sec^{-1}$ of the polyarylenethioether formed by the polymerization reaction comprising said dehalogenation/sulfidation reaction becomes at least 500 poise.

* * * * *